United States Patent Office 2,969,355
Patented Jan. 24, 1961

2,969,355

METHOD OF PREPARING CELLULOSE SULFATE

Carl J. Malm, Martin E. Rowley, and Gordon D. Hiatt, Rochester, N.Y., assignors to Eastman Kodak Company, Rochester, N.Y., a corporation of New Jersey No Drawing. Filed May 15, 1958, Ser. No. 735,383

12 Claims. (Cl. 260—215)

This invention relates to a process of preparing water-soluble cellulose sulfate salts in which cellulose, activated or not, is sulfated with a mixture essentially consisting of sulfuric acid, an aliphatic acid of 4–6 carbon atoms and water in an amount 10–25% of the sulfuric acid used, which step is followed by separation of the sulfating liquid from the sulfated cellulose and directly converting the latter to water-soluble cellulose sulfate salt by the use of a suitable neutralizing agent.

Various methods have been described for the making of cellulose sulfate salts. For instance, previously cellulose has been treated with water, steeped in a solution of sulfuric acid in glacial acetic acid following which the cellulose was sulfated by dispersing in a liquid which is non-solvent for cellulose sulfate, the product being separated from the non-solvent and treated with an alkali metal compound. This procedure has the disadvantage that several steps are necessary in the described operation. In other cases, mixtures of sulfuric acid and alcohol have been employed for sulfating cellulose following which the product obtained is slurried in aqueous alcohol containing an alkali metal salt of a weak acid.

The presence of lower fatty acid has been avoided in cellulose sulfation processes, it having been commonly thought heretofore that cellulose esterification processes using lower fatty acid solvent resulted in: (1) the cellulose going into solution and (2) the presence of acyl groups in the esterification liquid imparting an appreciable acyl content to the cellulose during the reaction. Consequently, in the sulfation of cellulose by procedures in which the fibrous structure of the cellulose was retained, it has been thought necessary to use methylene chloride or some other non-fatty acid solvent to inhibit dissolving of the cellulose sulfate to retain the fibrous structure of the starting material.

One object of our invention is to provide a procedure for preparing cellulose sulfates, the sodium salts of which are water-soluble in which a fatty acid of 4–6 carbon atoms is employed as the diluent therein. Another object of our invention is to provide a method for preparing cellulose sulfates without any appreciable introduction of acyl groups into the cellulose. A further object of our invention is to provide a method of making cellulose sulfates in which the used sulfation liquid can be fortified and reused in subsequent sulfation procedures. A still further object of our invention is to provide a method of making cellulose sulfate salts in which the cellulose sulfate is separated from the liquid containing the sulfuric acid and fatty acid and is directly converted to salt form by treatment with appropriate neutralizing agents. Other objects of our invention will appear herein.

We have found that cellulose sulfates are conveniently prepared by initially reacting upon cellulose with a bath comprising a considerable excess of sulfuric acid, water in an amount of 10–25% based on the sulfuric acid and a fatty acid of 4–6 carbon atoms as the diluent. Following this the cellulose sulfate formed is separated from the sulfation liquid and is treated with a base or an appropriate salt of a weak acid whereby a water-soluble cellulose sulfate salt is obtained. We have found that the spent sulfation liquid separated from the undissolved product is, when fortified, readily adapted for reuse in further cellulose sulfation procedures.

In its broadest aspects our invention comprises the preparation of cellulose sulfate salts in which the cellulose is initially treated with at least 3 parts of sulfation bath per part of cellulose. The upper limit is governed only by convenience of operation and can be up to 100 parts or more of bath per part of cellulose. The bath preferably is composed of 35–85% of sulfuric acid of which 10–25% is water, the remainder being fatty acid of 4–6 carbon atoms. The reaction mass is free of any acid anhydride or other anhydride which would destroy the water present in or acquired by the mass.

After the sulfation has run to the desired point (to a combined sulfur content of at least 3%) the cellulose sulfate formed is separated from the sulfation mass and without further treatment, except washing, is reacted with a base or the salt of a weak acid so as to obtain a water-soluble salt of cellulose sulfate. For instance, used in the neutralizing treatment may be sodium acetate, sodium carbonate, aqueous ammonia, trisodium phosphate, sodium bicarbonate, or, in fact, any alkali metal or ammonium compound which will replace the hydrogen of the cellulose sulfate with a cation which will assure a water-soluble cellulose sulfate salt. For instance, magnesium compounds such as magnesia or aluminum compounds may be employed to convert the cellulose sulfate to the corresponding salts. Amines such as methyl amine or diethyl amine may be employed to form the salt of the cellulose sulfate.

Any type of cellulose such as cotton linters, wood pulp, wood flour, etc. may be employed as the starting material. The cellulose may first be subjected to a swelling treatment such as with aqueous alkali or water, the water being removed from the cellulose by replacing with fatty acid of 4–6 carbon atoms such as is to be used as to the solvent in the sulfation step. Swelling may be conveniently performed upon cellulose in porous sheet form, i.e. wood pulp sheet, by spraying it with water or aqueous swelling agent (if the latter following with a water spray) and then replacing the water with fatty acid of 4–6 carbon atoms the sheet being passed over suction boxes whereby the cellulose is first treated with water or aqueous liquid and the water is replaced from the cellulose sheet with fatty acid of 4–6 carbon atoms. The sheet may then be broken up for the sulfation procedure or if desired the sulfation may be carried out by passing the sulfation liquid through the cellulose sheet with the aid of suction.

The acid employed to remove the water and as the diluent in the sulfation step may be any fatty acid of 4–6 carbon atoms, such as butyric acid, isobutyric acid, valeric acid, isovaleric acid, caproic acid or the like. If the clarity of the cellulose sulfate salt when dissolved in water is not of importance, activation of the cellulose can be dispensed with, the activation of the cellulose having the effect of imparting greater effectiveness to the sulfating liquid in reacting upon the cellulose.

The sulfation bath is prepared by mixing together sulfuric acid and fatty acid of 4–6 carbon atoms. The sulfuric acid (containing 10–25% water) preferably constitutes 35–85%. Percentages of sulfuric acid below 40% result in a slower rate of reaction. When more than 80% of sulfuric acid is used, care should be used to avoid dissolving the cellulose or loss of fibrous structure. The amount of fatty acid in the sulfating liquid includes the fatty acid contained in the cellulose when the cellulose had been activated with water and dewatered with fatty acid. The amount of fatty acid in the sulfating liquid is usually within the range of 60–16%, or better 50–20%.

In the sulfating of cellulose the ratio of sulfating liquid to cellulose is ordinarily within the range of 15–30 to 1 although the liquid used may be in any amount of at least 3 parts per part of cellulose. When a ratio lower than 5–10 to 1 is used, the mixing must be extremely efficacious to overcome the disadvantage of the small amount of liquid and products of lowered viscosity result. The acyl content of the cellulose sulfate product prepared in accordance with our invention ordinarily does not exceed 4% and in most sulfations in accordance therewith the acyl content is on the order of 0.5%.

The sulfation in accordance with our invention is preferably carried out at a temperature within the range of 0–20° C. It is well known that cellulose is degraded by sulfuric acid at higher temperatures and consequently lower temperatures are preferred to avoid break-down or degradation of the cellulose. If lower viscosity products are desired sulfation temperatures in the upper part of the range given may be used or even a temperature above that range with sulfuric acid of a high strength. A convenient time for running the sulfation is 2 hours although the use of a higher temperature may shorten the time desired, whereas with lower temperatures the reaction may be run for a longer time. The sulfation should be run until the cellulose sulfate product has a combined sulfur content of at least 3% or even better of at least 4%. There is thus obtained products whose sodium salts have good water-solubility.

After the sulfation has occurred, the undissolved cellulose sulfate is separated from the liquid, is washed free of acid and is then treated with or immersed in a solution of a neutralizing agent which converts the product to a water-soluble salt. The neutralizer may be conveniently employed in a 2–10% concentration although the treatment is not restricted to concentrations within this range. Some neutralizing agents which may be conveniently employed for conversion of the acid cellulose sulfate to a salt are sodium acetate, sodium bicarbonate, ammonium hydroxide, methyl amine, diethyl amine, magnesium acetate and the like. It is desirable that the maximum quantity of sulfating bath be removed from the cellulose sulfate prior to the forming of its salt. To retain the fibrous structure it is desirable in converting to the salt form that the water solutions of neutralizing agents used be diluted with alcohol or the like. On the other hand, the alcohol may be omitted if an aqueous solution of the cellulose salt is desired.

The cellulose sulfate salts prepared in accordance with our invention are useful where water-soluble cellulose compounds are desirable. Some instances of uses of these salts are as detergent aids, in drilling muds, as thickeners in cosmetics, in coating compositions or the like, as a water-soluble thickener and sizing agent in textile printing and sizing, as a material for treating paper or the like.

After the sulfation step occurs, the fibrous cellulose sulfate obtained is separated from the sulfating liquid and the spent sulfating liquid is then useful for re-employment in a subsequent sulfation merely by adjusting its compositions such as by fortification thereof with sulfuric acid.

The following examples illustrate the preparation of cellulose sulfates by sulfating with a mixture of sulfuric acid, water and fatty acid of 4–6 carbon atoms:

Example 1

14 parts of 95% sulfuric acid and one part of water were added to 5 parts of isobutyric acid. The solution was cooled to 5° C. and one part of cotton linters were added thereto. The mixture stood for 45 minutes and a maximum temperature of 21° C. was reached. The fibrous cellulose hydrogen sulfate thus obtained was collected on a sintered glass funnel and was washed with isobutyric acid and then with isopropanol. The thus washed material was treated with a solution of sodium bicarbonate in water-isopropanol. A sodium cellulose sulfate readily soluble in water was obtained. The product had a sulfur content of 10.1% and the isobutyryl content was approximately 0.5%.

Example 2

A mixture was prepared of 50 parts of distilled water, 325 parts of 95% sulfuric acid, and 125 parts of normal butyric acid. This mixture was cooled to 5° C. and there was added thereto 20 parts of refined cotton linters which had been activated by soaking in water and removing the water with normal butyric acid, these linters also containing 20 parts of butyric acid. The mass was held at 5° C. by cooling for 1⅔ hours and the temperature was then allowed to rise to 12° C. over a period of ½ hour. The fibrous cellulose hydrogen sulfate obtained was separated from the liquid, was washed with butyric acid, and then with isopropanol, and was treated with a 2% solution of sodium bicarbonate in water-isopropanol to obtain the sodium salt of the cellulose sulfate. The product obtained had a viscosity of 312 centipoises in water solution at 2% concentration and had a sulfur content of 4.3% and a butyryl content of 1%.

Example 3

350 parts of 95% sulfuric acid, 10 parts of water and 140 parts of n-valeric acid were mixed and the mixture was cooled to 5° C. 20 parts of cotton linters was added forming a slurry which was allowed to stand for 2⅔ hours at approximately 5° C. Cellulose hydrogen sulfate formed and was collected on a sintered glass funnel. It was washed with n-valeric acid and isopropanol and was neutralized with sodium bicarbonate. The resulting sodium cellulose sulfate contained 9.05% sulfur and had a viscosity of 13.4 centipoises in water solution at 2% concentration.

Example 4

A mixture of 325 parts of 95% sulfuric acid, 25 parts of water and 150 parts of caproic acid was cooled to 5° C. To the mixture was added 20 parts of cotton linters to form a slurry which was allowed to stand at 10–12° C. for 40 minutes. The product was isolated in a similar fashion as previously described contained 5.87% sulfur and had a viscosity of 9.1 centipoises in a water solution of 2% concentration.

Example 5

A mixture of 1800 parts of 95% sulfuric acid, 300 parts of water and 795 parts of n-butyric acid was cooled to 20° F. The cooled mixture was added to a W & P mixer containing 150 parts of activated cotton linters (wet with 105 parts of n-butyric acid). The temperature of the slurry was maintained at 41° F. for 1½ hours and at 50° F. for 50 minutes. The product was isolated as previously described and while wet with isopropanol was neutralized with aqueous sodium carbonate. The product was washed with an isopropanol:water mixture and dried at 140° F. A 2% solution in water showed thixotropic properties having a minimum viscosity after rapid stirring of more than 1000 centipoises. The sulfur content was 3.33%.

Example 6

4 discs (total of 17 parts) of sheet cotton linters were placed in a Büchner funnel and soaked with water followed by replacement of the water with isobutyric acid. A sulfating mixture consisting of 30 parts of water, 360 parts of 95% sulfuric acid and 210 parts of isobutyric acid was cooled to 5° C. The sulfating mixture was slowly pulled through the linter discs, giving a total contact time of 1½ hours. The larger portion of sulfuric acid remaining in the linters was removed by pulling isobutyric acid therethrough. Following two washes with isopropanol, the cellulose hydrogen sulfate formed was neutralized by slurrying in a mixture consisting of 4 parts sodium hydroxide, 200 parts water and 500 parts of isopropanol. The sodium cellulose sulfate thus obtained was washed repeatedly with an isopropanol: water mixture until neutral. The product contained 6.87% sulfur and had an isobutyryl content of 0.37%.

Example 7

Sodium cellulose sulfate was prepared using the same sulfating bath as described in Example 5. The sulfation time was 3½ hours, giving a lower viscosity product. A 2% solution in water was prepared to which was added sufficient quantity of aluminum sulfate to convert the sodium cellulose sulfate to aluminum cellulose sulfate. The product showed a slight milky appearance as a water solution.

Example 8

A cellulose hydrogen sulfate prepared as described was neutralized in a solution consisting of 20% triethanolamine, 20% distilled water and 60% methanol. The organic salt was soluble in water, insoluble in methanol.

Example 9

Wood flour was soaked in hot water for ¾ of an hour and dewatered with three changes of isobutyric acid, leaving a material with a liquid: solid ratio of 2:1. A mixture of 325 parts of 95% sulfuric acid, 25 parts of water and 110 parts of isobutyric acid was cooled to 0° C. To the mixture was added 20 parts of the isobutyric acid wet wood flour (containing 40 parts of isobutyric acid) and allowed to stand at 5 C. for 1⅔ hours. The product was isolated as previously described and neutralized with sodium bicarbonate. The neutralized material, when dissolved in water, gave a low viscosity solution at 2%. The product was readily bleached using potassium permanganate.

Example 10

A mixture of 300 parts of 95% sulfuric acid, 50 parts of water and 150 parts of isobutyric acid was cooled to 0° C. To the mixture was added 20 parts of wood pulp and a slurry was formed which was allowed to stand at 6° C. for 4⅙ hours. The cellulose hydrogen sulfate obtained was collected on a sintered glass funnel, washed with isobutyric acid and with isopropanol and while wet with isopropanol was neutralized with sodium bicarbonate in water. The dried product sodium cellulose sulfate was soluble in water in which it exhibited a medium viscosity solution at 2% concentration.

Example 11

A mixture of 325 parts of 95% strength sulfuric acid, 50 parts of water and 125 parts of n-valeric acid was cooled to 5° C. and 20 parts of cotton linters was stirred into the mixture to form a slurry which was allowed to stand for 3 hours at approximately 7° C. The product obtained was washed with valeric acid and then washed free of acid with isopropanol. The cellulose sulfate resulting had a combined sulfur content greater than 4%. The product was neutralized with a 2% aqueous solution of sodium bicarbonate whereby a water-soluble sodium cellulose sulfate was obtained.

Example 12

The sulfating mixture which was collected in a suction flask from the pull through in Example 6 was again cooled to 5° C. and reused to sulfate a second 17 parts of sheet linters. The same procedure was followed and gave a sodium cellulose sulfate of similar analysis to that of Example 6. If the sulfuric content is low as a result of repeated sulfations some additional sulfuric acid should then be added to the spent sulfating liquid to fortify the same prior to its use for further cellulose sulfations.

Example 13

A mixture of 540 parts of 95% sulfuric acid, 90 parts of water and 60 parts of n-butyric acid was cooled to 0–5° C. The cold mixture was poured over 300 parts of activated cotton linters (wet with 210 parts of n-butyric acid) in a W & P mixer. The jacket temperature of the mixer was maintained at 34° F. for 1 hour, after which it was raised to 50° F. and held for 6 hours. At the end of the reaction, the contents of the mixer was washed with 2 changes of isopropanol, neutralized with sodium carbonate, washed with isopropanol-water and dried. A 3% water solution of the resulting salt was of medium viscosity.

We claim:

1. A method of preparing cellulose sulfates whose sodium salts are water soluble, which comprises sulfating cellulose by reacting thereon for a time within the range of approximately 40 minutes to approximately 420 minutes with an esterification bath essentially consisting of a homogeneous mixture of sulfuric acid, fatty acid of 4–6 carbon atoms and water, the latter in an amount 10–25% of the sulfuric acid until an undissolved cellulose hydrogen sulfate having a combined sulfur content of at least 3% is obtained.

2. A method of preparing cellulose sulfates whose sodium salts are water soluble, which comprises sulfating cellulose by reacting thereon for a time within the range of approximately 40 minutes to approximately 420 minutes with an esterification bath essentially consisting of a homogeneous mixture of sulfuric acid, a fatty acid of 4 carbon atoms and water, the latter in an amount 10–25% of the sulfuric acid until an undissolved cellulose hydrogen sulfate having a combined sulfur content of at least 3% is obtained.

3. A method of preparing cellulose sulfates whose sodium salts are water soluble, which comprises sulfating cellulose by reacting thereon for a time within the range of approximately 40 minutes to approximately 420 minutes with an esterification bath essentially consisting of a homogeneous mixture of sulfuric acid, isobutyric acid and water, the latter in an amount 10–25% of the sulfuric acid until an undissolved cellulose hydrogen sulfate having a combined sulfur content of at least 3% is obtained.

4. A method of preparing cellulose sulfates whose sodium salts are water soluble, which comprises sulfating cellulose by reacting thereon for a time within the range of approximately 40 minutes to approximately 420 minutes with an esterification bath essentially consisting of a homogeneous mixture of sulfuric acid, normal butyric acid and water, the latter in an amount 10–25% of the sulfuric acid until an undissolved cellulose hydrogen sulfate having a combined sulfur content of at least 3% is obtained.

5. A method of preparing cellulose sulfates whose sodium salts are water soluble, which comprises sulfating cellulose by reacting thereon for a time within the range of approximately 40 minutes to approximately 420 minutes with an esterification bath essentially consisting of a homogeneous mixture of sulfuric acid, valeric acid and water, the latter in an amount 10–25% of the sulfuric acid until an undissolved cellulose hydrogen sulfate having a combined sulfur content of at least 3% is obtained.

6. A method of preparing cellulose sulfates whose sodium salts are water soluble, which comprises sulfating cellulose by reacting thereon for a time within the range of approximately 40 minutes to approximately 420 minutes with an esterification bath essentially consisting of a homogeneous mixture of sulfuric acid, caproic acid and water, the latter in an amount 10–25% of the sulfuric acid until an undissolved cellulose hydrogen sulfate having a combined sulfur content of at least 3% is obtained.

7. A method of preparing water soluble cellulose sulfate salts which comprises sulfating cellulose by reacting thereon for a time within the range of approximately 40 minutes to approximately 420 minutes with an esterfication bath essentially consisting of a homogeneous mixture of sulfuric acid, fatty acid of 4–6 carbon atoms and water, the latter being 10–25% of the sulfuric acid until an undissolved cellulose hydrogen sulfate having a combined sulfur content of at least 3% is obtained, freeing the cellulose hydrogen sulfate obtained of acid and reacting thereon with a neutralizing agent in 2–10% concentration, which neutralizing agent is selected from the group consisting of sodium acetate, sodium bicarbonate, ammonium hydroxide, methylamine, diethylamine and magnesium acetate.

8. A method of preparing a water soluble salt of cellulose sulfate which comprises sulfating cellulose by reacting thereon for a time within the range of approximately 40 minutes to approximately 420 minutes with an esterification bath essentially consisting of a homogeneous mixture of sulfuric acid, isobutyric acid and water, the latter being in an amount 10–25% of the sulfuric acid until an undissolved cellulose hydrogen sulfate having a combined sulfur content of at least 3% is obtained, then freeing the cellulose hydrogen sulfate thus obtained of acid and treating directly with an alkaline neutralizing agent whereby the salt of the cellulose sulfate is formed.

9. A method of preparing sodium cellulose sulfate which comprises sulfating cellulose by reacting thereon for a time within the range of approximately 40 minutes to approximately 420 minutes with an esterification bath essentially consisting of a homogeneous mixture of sulfuric acid, isobutyric acid and water, the latter in an amount 10–25% of the sulfuric acid until an undissolved cellulose hydrogen sulfate having a combined sulfur content of at least 3% is obtained, then freeing the cellulose sulfate obtained of acid and reacting upon the thus washed product with a solution of sodium bicarbonate in water-isopropanol to convert the cellulose acid sulfate to the sodium salt thereof.

10. A method of preparing cellulose sulfates whose sodium salts are water soluble which comprises sulfating cellulose by reacting thereon for a time within the range of approximately 40 minutes to approximately 420 minutes with an esterification bath essentially consisting of a homogeneous mixture of sulfuric acid, fatty acid of 4–6 carbon atoms and water, the latter in an amount 10–25% of the sulfuric acid until an undissolved cellulose sulfate having a combined sulfur content of at least 3% is obtained, separating the sulfating liquid from the product obtained, and reacting upon a subsequent mass of cellulose therewith to convert same to a cellulose sulfate having a combined sulfur content of at least 3%.

11. A method of preparing a salt of cellulose sulfate which comprises sulfating cellulose by reacting thereon for a time within the range of approximately 40 minutes to approximately 420 minutes with an esterification bath essentially consisting of a homogeneous mixture of sulfuric acid, fatty acid of 4–6 carbon atoms and water, the latter in an amount 10–25% of the sulfuric acid until an undissolved cellulose hydrogen sulfate having a combined sulfur content of at least 3% is obtained, then freeing the cellulose hydrogen sulfate thus obtained of acid and reacting thereon with an alkali metal compound which will replace the hydrogen of the cellulose hydrogen sulfate whereby a water-soluble cellulose sulfate salt is obtained.

12. A method of preparing a salt of cellulose sulfate which comprises sulfating cellulose by reacting thereon for a time within the range of approximately 40 minutes to approximately 420 minutes with an esterification bath essentially consisting of a homogeneous mixture of sulfuric acid, fatty acid of 4–6 carbon atoms and water, the latter in an amount 10–25% of the sulfuric acid until an undissolved cellulose hydrogen sulfate having a combined sulfur content of at least 3% is obtained, then freeing the cellulose hydrogen sulfate of acid and reacting thereon with an ammonium compound which will replace the hydrogen of the cellulose hydrogen sulfate whereby a water-soluble cellulose sulfate salt is obtained.

References Cited in the file of this patent

UNITED STATES PATENTS 2,714,591　　Klug et al. ＿＿＿＿＿＿＿＿ Aug. 2, 1955

OTHER REFERENCES

Ott: "Cellulose and Cellulose Derivatives," Interscience Publishers, Inc., New York, N.Y. (1946), vol. V, page 665.